Dec. 16, 1969        C. MASON        3,483,655
COACTING DOLL AND CRADLE, INCLUDING ELECTRIC SOUNDER
AND TIME DELAY DEVICE
Filed March 6, 1967

INVENTOR.
COLLINS MASON
BY
ATTORNEYS

United States Patent Office 3,483,655
Patented Dec. 16, 1969

3,483,655
COACTING DOLL AND CRADLE, INCLUDING ELECTRIC SOUNDER AND TIME DELAY DEVICE
Collins Mason, 2827 Forrester Drive,
Los Angeles, Calif. 90064
Filed Mar. 6, 1967, Ser. No. 620,858
Int. Cl. A63h 33/26, 5/00
U.S. Cl. 46—232                          2 Claims

ABSTRACT OF THE DISCLOSURE

This invention comprises a doll, cradle, and an associated timer-controlled, sound-producing unit so combined, related and operable as realistically to simulate human actions, comprising a manually presettable timer operable to delay the production of sound for a predetermined time period after being energized, and an energizing switch which automatically functions in response to superimposing the weight of the doll on the cradle and a de-energizing switch which functions automatically to de-activate the sound unit in response to the act of a child in removing the doll from the cradle. The disclosure also relates to the method of accomplishing said simulated acts.

---

All sound toys of which I am aware must be held in the hands and manually manipulated while producing sound. Even with the great power children have to imagine and pretend, such necessary manual handling and manipulation destroy the illusion of realism of the actions of the toy. For instance, in playing with a doll, a child imagines itself performing the acts of a real life mother in caring for her infant, and part of such care normally involves the mother inducing the infant to sleep, then putting it on a cradle, bed or other support, and, after a sleep or nap period, the infant suddenly awakens and begins voluntarily to cry, apparently of its own accord. By my invention, a child may, with her doll, realistically simulate that course of action and behavior with the illusion of human realism.

It is therefore a major object of my invention to provide a method of using and operating an inanimate figure to simulate the human actions of an infant child being cared for by its mother.

An object of my invention is also to provide a particular combination of elements so relatively arranged and operative realistically to simulate said actions.

It is a further object of my invention to further aid said illusion by incorporating means operative automatically to energize and de-energize the sound unit of my combination in response respectively to positioning the figure on and removing it from a support.

It is also an object to provide a method and device of the character described wherein the sound unit optionally may be carried within the housing which simulates the appearance of the desired figure, or it may be carried by a cradle or support for the figure in position immediately adjacent the position of the figure on the support.

Other and more subordinate objects of my invention will be apparent from the following description of presently preferred embodiments, for which purpose I shall refer to the accompanying drawing wherein:

FIG. 1 is a side elevation of one embodiment of my invention;

FIG. 2 is an enlarged fragmentary side elevation, partly in section, of another embodiment of my invention;

FIG. 3 is an enlarged longitudinal sectional view of the sound-producing element of my invention; and FIG. 4 is a section taken on line 4—4 of FIG. 3.

In the drawing I have chosen to illustrate my invention by means of embodiments including an inanimate figure such, for instance, as that of a toy doll which is automatically caused to commence emitting sound in a predetermined delayed time relationship to the energization of the sound-producing unit; and in said embodiments the sound unit optionally may be housed within the figure or within a support therefor.

Referring now to the drawing, the numeral 5 generally denotes a housing shaped to simulate the appearance of a conventional doll figure carrying a power energizable sound-producing unit 6. The doll figure may be positioned in reclining position on a support 7, which may take the form of a conventional cradle, bed or other support.

The sound-producing unit 6 (shown more particularly in FIGS. 3 and 4), comprises a rectangular casing 15 carrying a continuous sound tape 17 trained about a power-driven roller 17a and an idler roller 18. Roller 17a is rotatably journalled in a bearing 17b carried by a side wall of the casing 15, while roller 18 is journalled on a stub shaft 14, carried by the casing side wall. The tape 17 may contain one continuous sound groove or several parallel grooves capable of producing a sound characteristic of the FIGURE 5. A sound pickup member 20 is preferably made of a resonant metal and terminates at its outer end portion in a U-shaped portion 21 provided with aligned holes for frictionally receiving a conventional pickup needle 23. The inner end portion of the pickup member 20 is preferably secured, as by riveting, to the underside of the top wall of the casing 15 which is provided with holes 24 for passing sound.

The sound unit is energized as by a conventional battery 30, one of whose terminals is connected to a stationarily mounted switch contact 51 of a switch 32 and which is adapted to be contacted by the outer end of a resilient switch arm 34, whose inner end portion is secured, as by welding, to the inner surface of the bottom wall of the casing 15, and carries a switch terminal 35.

The switch 32 is actuated by a plunger 50 which projects through the bottom wall of the casing 15 in position to be automatically engaged and depressed by the support member 7 in response to positioning of the doll FIGURE 5 in reclining position on the support.

A pulley 43 is secured on a drive shaft 19 projecting from the driven roller 17a. A continuous belt 41 is trained about the pulley 43 and about a pulley 42 secured on the driven shaft of a motor 40 carried by a mounting member 40a secured to the side wall of the casing 15.

A conventional timing switch 60 is suitably mounted in the casing 15, the switch here shown being a spring-actuated timer. One of its terminals is conductively connected to the switch 32 while another of its terminals is conductively connected to the other terminal of the battery 30. The terminals 45 and 46 of the time switch 60 are conductively connected to the terminals of the motor 40. The time switch has a manual energizing knob 37. Thus the time switch maintains the circuit open for the desired predetermined time period, after which it again closes the circuit to the motor M to operate the sound tape mechanism.

The embodiment of FIG. 2 is the same as before described, excepting only that here the casing 15 is mounted in a recess 65 in the body of the support 15, the plunger 50 projecting from the casing in position to be depressed by the weight of the figure 5 when said weight is imposed thereon.

In practice, of course, the clothing (not shown) of the doll figure 5 will conceal the plunger, while, in the embodiment of FIG. 2, a bed sheet (not shown) such as customarily used on a cradle or bed, will conceal the plunger. In either case, the sound-producing unit will be energized in response to imposing the weight of the doll figure on the plunger.

In the practice and operation of my invention, the circuit to the time switch will automatically become energized by imposing the weight of the doll figure on the plunger 50 of the unit, whether said unit is carried by the figure or by the support. This occurs when the user puts the doll figure "to bed," so to speak. However, before the doll figure is "put to bed," the time switch 60 will be set to delay closing of the circuit to the motor 40 for such predetermined period as may be desired. Thus the doll figure may remain unattended on the support for said predetermined time period, which measures the duration of the simulated "sleep" period. Then, while the figure is still unattended, it will, in response to the operation of the time switch, automatically, and seemingly of its own accord, begin to emit a sound, which normally would be a "crying" sound. The figure will continue to emit such sound until the user removes the figure from the support, which will automatically cause switch 32 to open the energizing circuit.

Thus it will be seen that it is possible by my method or device to create the highly realistic illusion that an inanimate toy figure, while unattended and without manual handling or manipulating, will go through the actions and emit sound as would a real life infant.

I claim:

1. In a toy characterized by its ability to enable a child, in playing with a doll and cradle, to simulate the acts of a real life mother and an infant: the combination of a cradle member a doll member adapted to be placed on said cradle member and to be removed therefrom, an electrically actuated sound producer capable of producing sound characteristic of said doll member and a power transmitting means mounted in one of said members; switch means carried by said last named member, said switch means being operable in response to imposing or relieving the weight of said doll member on said cradle member automatically to alternately energize and deenergize said power transmitting means, and control means for delaying the actuation of said sound producer for a predetermined period after said power transmitting means has been energized, said control means comprising a time switch interposed in said power transmitting means between said first mentioned switch means and said sound producer.

2. The toy described in claim 1 wherein said time switch is manually adjustable.

References Cited
UNITED STATES PATENTS

| | | | |
|---|---|---|---|
| 3,014,312 | 12/1961 | Convertine | 46—247 |
| 2,212,623 | 8/1940 | Strauss | 46—117 |
| 2,505,626 | 4/1950 | Palmer | 46—232 |
| 3,190,037 | 6/1965 | Giordano | 46—232 X |

F. BARRY SHAY, Primary Examiner

U.S. Cl. X.R.

46—117, 243